March 3, 1931. H. A. CALDERWOOD 1,795,107
FASTENING MEANS FOR SEPARABLE PARTS
Filed Feb. 1, 1929
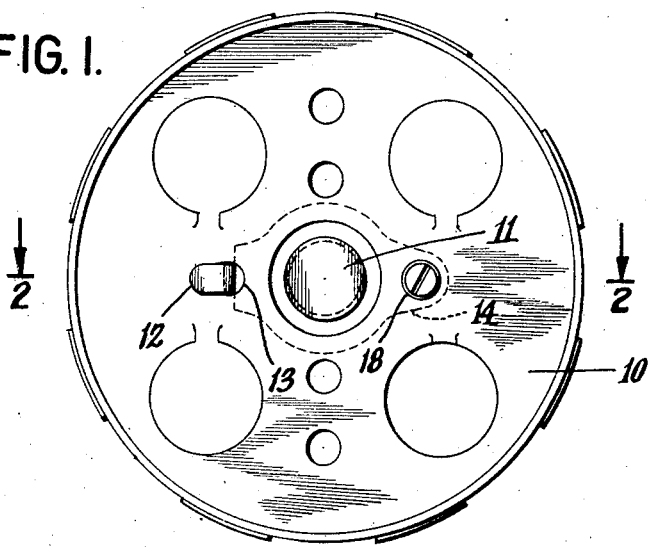
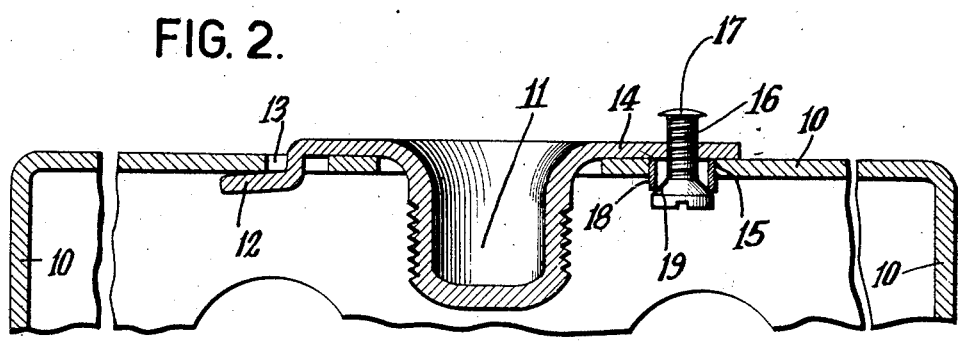
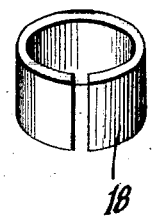 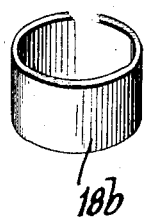 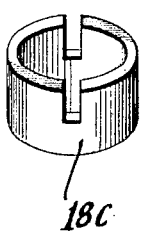 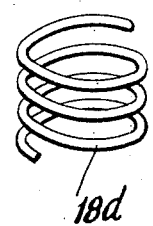
Inventor
Hugh A. Calderwood
By his Attorneys
Cooper, Kerr & Dunham Patented Mar. 3, 1931

1,795,107

UNITED STATES PATENT OFFICE

HUGH A. CALDERWOOD, OF PITTSBURGH, PENNSYLVANIA, ASSIGNOR TO NATIONAL ELECTRIC PRODUCTS CORPORATION, OF NEW YORK, N. Y., A CORPORATION OF DELAWARE

FASTENING MEANS FOR SEPARABLE PARTS

Application filed February 1, 1929. Serial No. 336,809.

In electrical wiring practice where conduits and outlet boxes and the like are employed occasion frequently arises where various separate parts are held together by small screws. The parts and assemblies are frequently of such character that it is necessary that they be assembled and disassembled several times before the installation is complete. This means that the attaching screws must be removed and replaced, which operation is not only troublesome and annoying because of the frequent inaccessibility of the screws but in addition these screws frequently become lost and have to be replaced with others which may not be available. The annoyance and difficulty is especially encountered with ceiling outlet boxes provided with separate fixture studs which are screwed to the boxes by screws having heads which engage the lower surface of the top of the outlet boxes and which have threaded portions engaging threads in parts of the fixture stud members which are disposed above the top of the outlet boxes.

With such constructions the screws are rather inaccessible and in replacing them the act of replacing is troublesome and also there is great possibility and even a probability of loosing the screws when they are being removed or replaced.

The present invention has for one of its objects the provision of a novel form of fastening means for uniting separate parts by which the annoyance and difficulty of removing and replacing screws may be minimized and in which the insertion and engagement of a screw in an inaccessible part is wholly obviated.

A further object of the present invention resides in the provision of a construction which will provide for the ready assembly and disassembly of separable parts and which will also prevent the passibility of loss of the screws.

A further object of the present invention resides in the provision of a novel form of screw fastening means for securing together separable parts such as an outlet box and a fixture stud and in which the screws may be left in assembled relation and engaging the threads of one part, such as the fixture stud, and in which the screws including their head portions may be passed through openings in the other cooperating part, such as an outlet box, when it is desired to disassemble the parts.

A further object of the present invention resides in the provision of a construction employing an expanding means which is adapted to be expanded by the screw to clamp the same firmly to a cooperating part.

A further object of the present invention resides in the provision of a removable fastening construction employing an expanding member and a screw with a wedging portion and provided with a head of reduced size, all of which parts are adapted to be passed directly through a cooperating opening in one member, such as an outlet box, when it is desired to disassemble the separable parts.

Further and other objects of the present invention will be hereinafter set forth in the accompanying specification and claims and shown in the drawings which by way of illustration show preferred embodiments of the invention.

In the drawings:

Figure 1 is a bottom view of an outlet box incorporating my improved fastening means;

Fig. 2 is an enlarged sectional view taken on line 2—2 of Fig. 1;

Figs. 3 to 6 inclusive, show different forms of expanding members.

In more detail, I have shown my improved fastening means as used to fasten together an outlet box 10 and a fixture stud 11. The latter part comprises a lug or ear 12 which dips through an opening 13 in the outlet box and extends under the bottom of the top plate of the box. The part also comprises an extended portion 14 disposed over the top of the outlet box which is provided with a threaded opening to receive a fastening screw. Such part 14 and the screw threads are relatively inaccessible being covered from below by the outlet box which is provided with an opening 15. In lieu of using a screw with a large head so as to extend over the marginal edges of opening 15 as heretofore, a screw such as 16 is provided having a screw slotted head of reduced size so that it can pass through the opening 15. After the screw 16 is threaded into and assembled into part 14 of the fixture stud, the upper end of the screw is upset as shown at 17 so that subsequently it is difficult or impossible to unscrew 16 completely out of 14. Within the opening 15 I provide an expansion member 18 which is adapted to be expanded tightly into contact with the edges of opening 15 upon tightening up screw 16. To provide for such expansion the screw 16 is provided with wedging surfaces 19. The expansion member 18 may be made in various ways. It may comprise a slotted collar-like member such as shown at 18 in Fig. 3. If desired, it may be a plain unslotted collar of comparatively soft material as shown at 18b in Fig. 4, or the slot may extend substantially half way as shown at 18c in Fig. 5. Also an expansion member may be provided by utilizing a small section of spring as shown at 18d in Fig. 6.

When in use, and when it is desired to disassemble the box and fixture stud the screw stud 16 is backed off. The expansion member 18 can then contract and it and the head of the screw can be passed upwardly through the opening 15. To assemble the parts and secure them together the head of the screw is passed down through the opening and the stud 16 then tightened. This spreads or expands the expansion member and causes it to tightly grip the box 10. By this construction the screw or stud 16 is always maintained in assembled relation to the fixture stud and it is never necessary to completely remove the screw to disassemble the parts accordingly the bother and nuisance of trying to engage the relatively inaccessible screw threads is obviated and also there is no possibility of losing the screws.

What I claim is:

1. A fastening means for separable parts which parts include one inaccessible part overlying another underlying part which is accessible from below, said latter part being provided with an aperture, said fastening means comprising a screw having a threaded engagement with the overlying inaccessible part and adapted to be screwed in or out to a slight extent with respect to the same to secure the parts together or permit their disconnection, said screw having a head adapted to pass clearly through the aperture in the underlying part and having a screw slot in the head which is accessible from below the underlying part to permit in or out turning of the screw, said screw head having a tapered wedging portion, and means cooperating therewith and disposed in the aperture of the underlying part, which means is adapted to be clamped by the wedging portion of the screw head into clamping relation with the walls of the aperture in the underlying part, said means and screw being both adapted to pass through the aperture in the underlying part upon backing off of the screw and while it is still secured in the overlying part.

2. A fixture stud and box assemblage and fastening means therefor to permit the connection and disconnnection of the fixture stud and box with the box in situ and concealing and rendering inaccessible overlying parts of the fixture stud, said box having an aperture therein in its upper wall, said fixture stud having a part which overlies the said wall provided with a threaded aperture, a screw stud threaded in said threaded aperture and having a head portion adapted to pass through the aperture in upper wall of the box, said head having a screw slot therein and a wedging portion on its head, and means disposed in the aperture of the upper wall portion of the box which is displaced into clamping relation with the walls of the aperture by the wedging portion of the screw upon tightening of the screw for securing the fixture stud to the box, said screw and means being adapted to pass through the aperture upon partial backing off of the screw and while it is still carried by the overlying part of the fixture stud whereby the fixture and box may be separated.

In testimony whereof I hereunto affix my signature.

HUGH A. CALDERWOOD.